March 6, 1928.
J. A. ARMSTRONG ET AL
1,661,868
CLAMPING DEVICE
Filed May 27, 1927
2 Sheets-Sheet 2
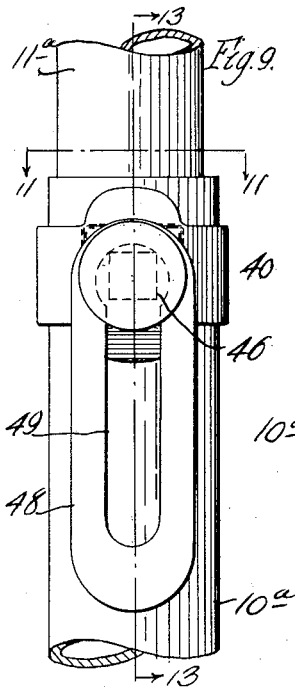
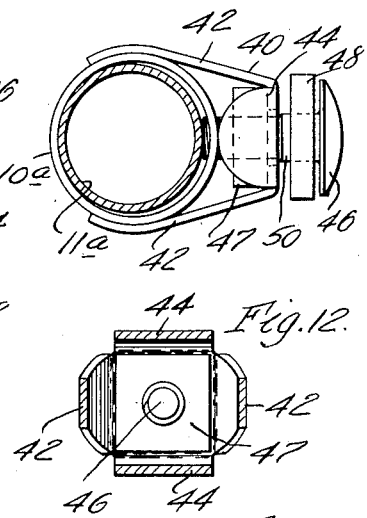
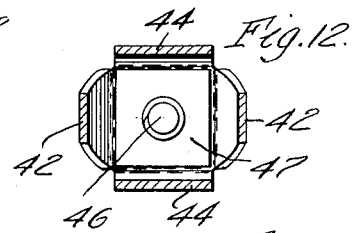
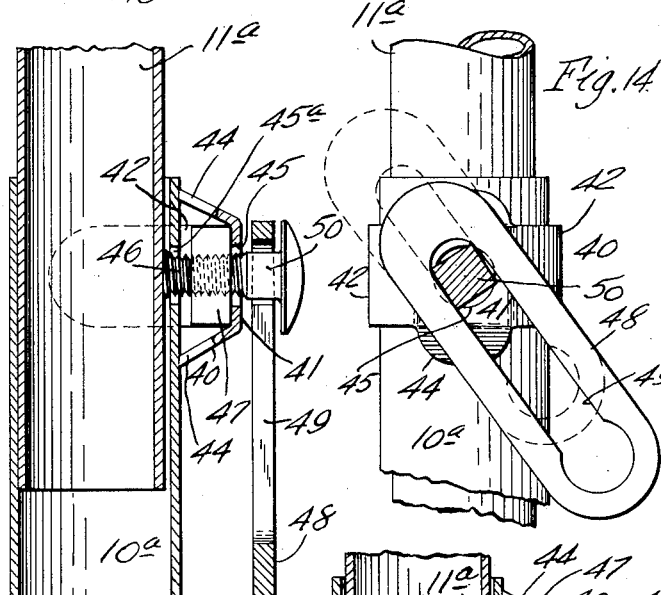
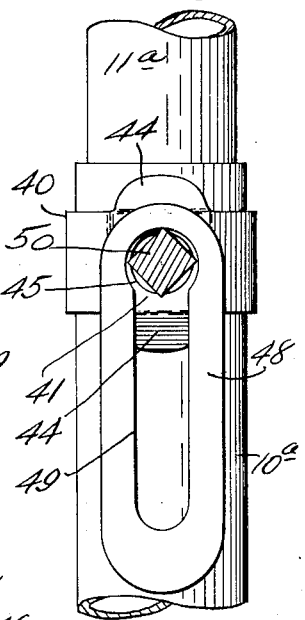
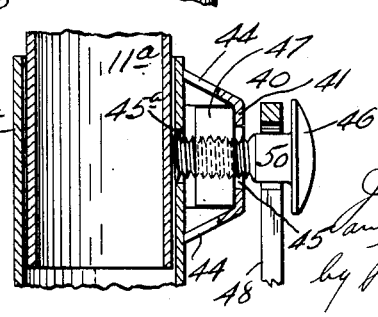
INVENTOR.
John A. Armstrong
and George O. Benson
by Parker & Prochnow
ATTORNEYS.

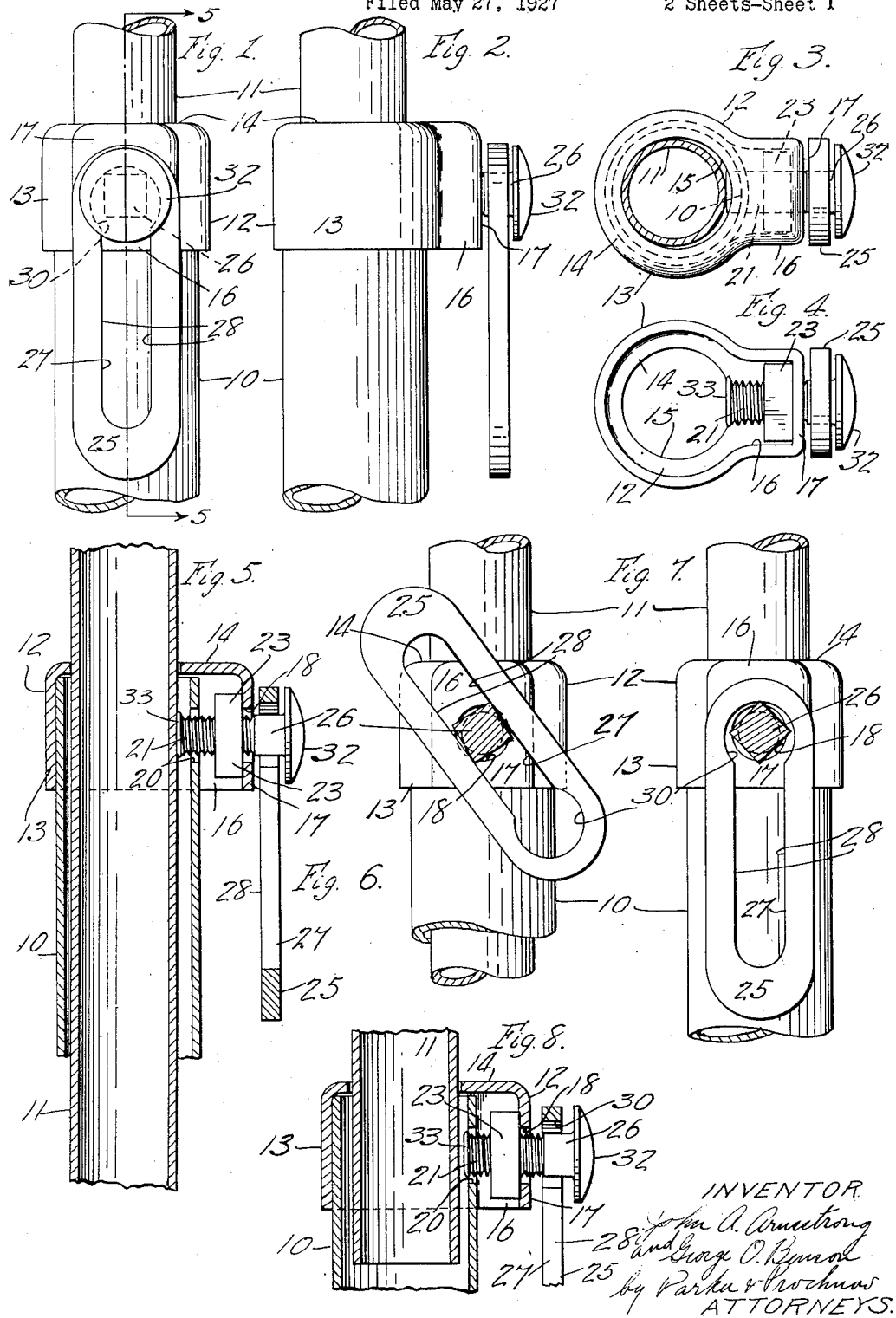

Patented Mar. 6, 1928.

1,661,868

UNITED STATES PATENT OFFICE.

JOHN A. ARMSTRONG AND GEORGE O. BENSON, OF NIAGARA FALLS, NEW YORK, ASSIGNORS TO NIAGARA METAL STAMPING CORPORATION, OF NIAGARA FALLS, NEW YORK.

CLAMPING DEVICE.

Application filed May 27, 1927. Serial No. 194,703.

This invention relates to clamping devices for clamping together two relatively adjustable or movable members.

An object of the invention is to provide a strong, simple and durable clamping device for the purpose stated, which consists of few parts and is inexpensive to produce.

Other objects are to provide a clamping device adapted for clamping telescopic members and which is provided with a part having an aperture through which one of the members extends into the other for positioning the first mentioned member with reference to the member into which it telescopes; also to provide a clamping device in which the strains resulting from the clamping action are largely taken up in the clamping device and one of the members without transmitting the strains to the other member; also to provide a device of this character having movable locking and holding parts which are largely concealed; also to provide a clamping device provided with a clamping part and with a holding part therefor which is held against turning in and displacement from the device; also to provide such a device in which all of the movable or operative parts are permanently assembled and in which misplacement of said parts is consequently prevented.

Other objects are to improve and simplify clamping devices of this character in the other respects hereinafter set forth in the claims.

In the accompanying drawings:

Fig. 1 is a front elevation of a clamping device embodying the invention, showing one form used in connection with a pair of telescoping members.

Fig. 2 is a side elevation thereof.

Fig. 3 is a plan view thereof with one of the telescoping members in section, showing the clamping device in locking position.

Fig. 4 is a bottom plan view of the clamping device detached.

Fig. 5 is a vertical sectional view on line 5—5, Fig. 1, with the parts in locking position.

Figs. 6 and 7 are face views thereof with the locking member in section and showing the operating member or tool in different positions in the respective figures.

Fig. 8 is a view similar to Fig. 5 showing the clamp in unlocking position.

Figs. 9 and 10 are a front elevation and a side elevation respectively, of a clamping device of a slightly modified construction, showing the same applied to a pair of telescoping members.

Fig. 11 is a plan view, partly in section thereof, on line 11—11, Fig. 9.

Fig. 12 is a sectional elevation of the clamping device on line 12—12, Fig. 10.

Fig. 13 is a vertical, sectional view on line 13—13, Fig. 9, showing the parts in locked position.

Figs. 14 and 15 are face views thereof with the locking member in section and showing the operating tool or member in different positions in the respective figures.

Fig. 16 is a vertical, sectional view similar to Fig. 13, with the parts in unlocked position.

The clamping device of the present invention is shown in the drawings in connection with a pair of cylindrical telescoping members 10, 11, but it is to be understood that the device can also be used for clamping together two relatively movable parts of other form without departing from the spirit of the invention.

In the embodiment illustrated, the clamping device comprises a frame or member 12 formed in any desired manner to secure the same to one of the two relatively movable members. In the construction shown, the clamping device has a substantially annular wall 13 extending about and rigidly secured to the outer member 10 in any suitable manner, preferably by welding. Preferably, the frame is arranged at one end of the member 10 and is provided with a transverse wall 14 extending across said end of the member 10. An aperture 15 of a size adapted to permit the other member 11 to slide therethrough into the member 10 is formed in said transverse end wall 14.

The frame is enlarged or extended at one side to provide a pocket or recess 16 having an end wall 17 in which an aperture or hole 18 is formed. The telescopic member 10 is also provided opposite the aperture 18 with a corresponding hole 20, and a locking member or bolt 21 extends inwardly through both of these apertures 18 and 20. Within the pocket 16 is arranged a nut or holding member 23 of square or polygonal form having threaded engagement with the bolt 21. This nut is so disposed, as shown in Fig. 4, that one or more of its side faces engage with the side wall or pocket, whereby the nut is prevented from turning.

By turning the bolt in the proper direction it will be advanced until its inner end engages the inner telescopic member 11, continued rotation of the bolt then causing the nut to forcibly engage the wall 17 of the pocket 16, thereby forcing and holding the member 11 rigidly against the edge of the hole 15 of the clamping device and clamping said member 11 in fixed relation to the member 10. Obviously, if the hole 15 is of the same or somewhat larger diameter than the inside diameter of the outer member 10, the member 11 will engage the inside wall of said member 10.

An operating member or tool 25 forming part of the clamping device is preferably provided for operating the bolt 21. For this purpose, in the construction shown, the bolt is provided with a square shank 26 outwardly beyond the wall 17, and the operating tool or wrench 25 is formed with a slot or opening 27 having opposite, parallel side edges 28 so spaced that these edges will engage opposite faces of the shank 26, see Fig. 6, and by using the tool in the manner of a wrench, the bolt can be turned in either direction. Preferably, one end of the slot 27 is enlarged at 30 sufficiently to permit the tool to loosely engage or turn freely about the shank 26 of the bolt, as shown in Fig. 7. The tool when not in use is intended to depend from the bolt as shown in Fig. 7, so that should the tool be accidently struck, the bolt will not be turned and the telescopic members accidently displaced. The wrench or tool also has the advantages of occupying very little space, since the tool can be arranged to extend parallel to the members 10 and 11 when the same are telescoped for packing or transportation, and the tool is permanently attached to the bolt so that it cannot be lost or misplaced. In order to permit the tool 25 to be permanently attached to the clamping device, the outer end of the bolt 21 is provided with a head 32.

Preferably the bolt 21 has its inner end upset or enlarged at 33 to prevent its disengagement from the nut 23, so that all of the parts, while being movable to perform their intended functions, are nevertheless permanently secured to the frame 14.

An important feature of the clamping device just described is that by forming the frame 13 so that it can fit over the outer telescopic member 10 and making the aperture 15 of only slightly larger dimensions than that of the telescopic member 11, this member 11 can be of considerably smaller diameter than the interior dimension of the outer member 10, thereby permitting free relative movements of the members 10 and 11 when the clamping member is released, even should one or the other of these members be slightly bent, see Fig. 5. Also, by forming the frame 13 so as to extend around and engage or bear on the member 10 at the side opposite to the bolt 21, the strains produced by the action of clamping the parts are transmitted to the frame and said part 10 without any tendency to weaken the structure or disconnect the frame from the member.

The frame 13, as shown, is preferably made of a single piece of sheet metal, and can be easily stamped or drawn to form. The operating tool 25 is in the form of a simple stamping, while the clamping bolt 21 and holding nut 23 can be of any ordinary or commercial form.

The clamping device can be readily assembled before securing to the member 10 or other part by first slipping the tool 25 on the bolt, inserting the bolt through the aperture 18 of the frame, turning the nut upon the threaded part of the bolt and then upsetting or forming the enlarged end 33 on the bolt. The device is then ready to be secured to one of the parts to be clamped.

In the construction shown in Figs. 9–16, the frame member 12 of the first construction is replaced by a frame member 40 of modified form. This frame is in the form of a bridge having an end wall 41, from the side edges of which extends a pair of oppositely directed arms or legs 42, the ends of which engage and are secured to the opposite sides of the outer telescoping member $10^a$. The ends of the arms 42 may be secured to the member $10^a$ as by welding or in any other manner adapted to form a rigid connection. Preferably, also the bridge 40 is provided with additional short, angularly extending arms 44 extending from the upper and lower edges of the end wall 41. The ends of these arms bear directly against the face of the member $10^a$ midway between the points of contact of the ends of the arms 42 and act to brace or stiffen the frame and prevent twisting of the frame relatively to the member $10^a$ in use.

The inner telescoping member $11^a$ extends directly into the member $10^a$ and is preferably of such size that it substantially fits the interior of said member $10^a$.

The end wall 41 of the frame or bridge 40 is apertured at 45 and a corresponding aperture $45^a$ is formed opposite thereto in the wall of the outer member $10^a$.

Operating and locking means similar to that shown in the first construction is used in connection with the modified frame 40 and comprises the locking bolt 46, holding nut 47 and operating tool or member 48, which is formed with a slot 49, the edges of which are adapted to engage the shank 50 of the locking bolt. The locking bolt extends through the apertures 45 and 45ᵃ and in locked position as shown in Fig. 13, the inner end of said bolt engages the telescoping member 11ᵃ and forces the same against the inner wall of the outer member 10ᵃ. The holding nut or member 47 is held from turning by the engagement of its outer edges or corners in the bottom of the pocket or recess formed by the angles between the legs 42 and 44 and the end wall 41 of the frame 40. This modified construction of clamping device can be attached at any place lengthwise of the member 10ᵃ, as desired.

We claim as our invention:

1. In a clamping device for clamping together two relatively movable members, a frame adapted to be secured to one of said members, a locking bolt supported on said frame to move into and out of locking relation to said other member, and a holding nut on said bolt which engages and is held from turning by said frame.

2. In a clamping device for clamping together two relatively movable members, a frame adapted to be secured to one of said members and having a pocket formed therein, a locking bolt supported on said frame and extending through said pocket and adapted to have endwise movement into and out of locking relation to said other member, and a holding nut arranged on said bolt within said pocket which engages said frame and is held from turning thereby.

3. In a clamping device for clamping together two relatively movable members, a frame adapted to be secured to one of said members, a locking bolt supported on said frame to move into and out of locking relation to said other member, a holding nut on said bolt which engages said frame and is held from turning thereby, said bolt having a shank formed to be engaged for turning the same and an operating tool movably secured on said bolt and which is formed to operatively engage said shank.

4. In a clamping device for clamping together two relatively movable members, a frame adapted to be secured to one of said members, a locking bolt supported on said frame to move into and out of locking relation to said other member, a holding nut on said bolt which engages and is held from turning by said frame, said bolt having a shank formed to be engaged for turning the same, and an operating tool having a slot through which said bolt extends and the edges of which are adapted to be engaged with said shank to turn said bolt, and said slot having an enlarged portion which is adapted to be brought into register with said shank to permit said tool to turn freely on said bolt.

5. In a clamping device for clamping together two relatively movable members, a frame adapted to be secured to one of said members, a locking bolt supported on said frame to move into and out of locking relation to said other member, a holding nut on said bolt which engages and is held from turning by said frame, said bolt having a shank formed to be engaged for turning the same, an operating tool loosely arranged on said bolt and which is formed to operatively engage said shank, means for preventing disengagement of said bolt and nut from said frame, and means for preventing disengagement of said tool from said bolt, whereby all parts of said clamping device are permanently assembled.

6. In a clamping device for clamping together two members, one of which telescopes within the other, a frame adapted to be secured to the end of one of said members and which is provided with a hole through which the other member is guided into telescoping relation within said first member, a locking bolt which passes through alined openings in said frame and said first member to move into and out of locking relation with said other member to bind the latter against the edge of said hole in said frame, and a holding nut on said bolt which engages and is held from turning by said frame.

7. In a clamping device for clamping together two members, one of which telescopes within the other, a frame adapted to be secured to one of said members and which is formed with a wall extending across the end of said member, said wall having a hole through which the other member is guided into telescoping relation within said first member, said frame having a pocket at one side thereof, a locking bolt extending through said pocket and through a hole in said first member for movement into and out of locking relation with said other member, a holding nut arranged on said bolt within said pocket and which engages and is held from turning by said frame, and operating means loosely engaging said bolt and permanently associated with said device for turning said bolt.

8. In a clamping device for clamping together two members, one of which telescopes within the other, a one piece, sheet metal frame adapted to embrace and be secured to an end of the outer member and which is formed with a wall extending across the open end of said member, said wall having a hole therein through which the inner member is guided into telescoping relation to said outer member, an integral pocket formed at one side of said frame, a locking bolt extending therethrough for movement into and out of locking relation to said inner member, a nut arranged on said bolt within said pocket and which is held from turning by engagement with said frame, and an operating tool carried loosely on said bolt outside said pocket and which is adapted to be operatively engaged with said bolt to turn the latter.

9. In a clamping device for clamping together two relatively movable members, a frame comprising a substantially annular wall formed to entirely surround an end of one of said members and having a pocket at one side thereof, a holding nut arranged in said pocket and which is held from turning therein, and a bolt passing through said pocket and operatively engaging said nut and which is movable into and out of locking engagement with said other member.

10. In a clamping device for clamping together two relatively movable members, a frame comprising a substantially annular wall extending entirely around an end of one of said members and an end wall extending across said end of said member and having an aperture therein through which the other member is guided, a pocket formed in and extending laterally from said annular wall, a holding nut disposed and held from turning within said pocket, and a locking bolt operatively engaging in said nut and which is movable into and out of locking engagement with said other member to hold the latter in fixed relation to said first member.

JOHN A. ARMSTRONG.
GEORGE O. BENSON.